United States Patent [19]
Field

[11] Patent Number: 4,461,144
[45] Date of Patent: Jul. 24, 1984

[54] ELECTROTHERMAL GAS THRUST UNITS

[75] Inventor: Stephen P. Field, Fleet, England

[73] Assignee: The Secretary of State for Defence in Her Britannic Majesty's Government of the United Kingdom of Great Britain and Northern Ireland, London, England

[21] Appl. No.: 358,106

[22] Filed: Mar. 15, 1982

[30] Foreign Application Priority Data

Mar. 19, 1981 [GB] United Kingdom ................ 8108630

[51] Int. Cl.³ ............................................. F02K 11/02
[52] U.S. Cl. ............................... 60/203.1; 60/39.462
[58] Field of Search ............... 60/39.462, 200.1, 203.1, 60/218

[56] References Cited

U.S. PATENT DOCUMENTS 3,220,180  11/1965  Heckert .
3,451,222   6/1969  Kelley .
4,288,892   9/1981  Kuenzly ........................... 60/39.462
4,322,946   4/1982  Murch et al. ..................... 60/203.1

FOREIGN PATENT DOCUMENTS 2733023  2/1978  Fed. Rep. of Germany ..... 60/203.1
2359285  2/1978  France .
1439754  6/1976  United Kingdom .
1470664  4/1977  United Kingdom .
2010406  6/1979  United Kingdom ............... 60/203.1

Primary Examiner—Louis J. Casaregola
Attorney, Agent, or Firm—Cushman, Darby & Cushman

[57] ABSTRACT

An electrothermal gas thrust unit for a space vehicle has a thrust chamber with an extension tube extending upstream therefrom. An injector tube leads into the extension tube and a diaphragm contacting the extension tube adjacent its juncture with the injection tube conducts heat away from that juncture to maintain the local temperature at a level below that at which liquid fuel (such as hydrazine) vaporizes.

7 Claims, 1 Drawing Figure

U.S. Patent   Jul. 24, 1984   4,461,144
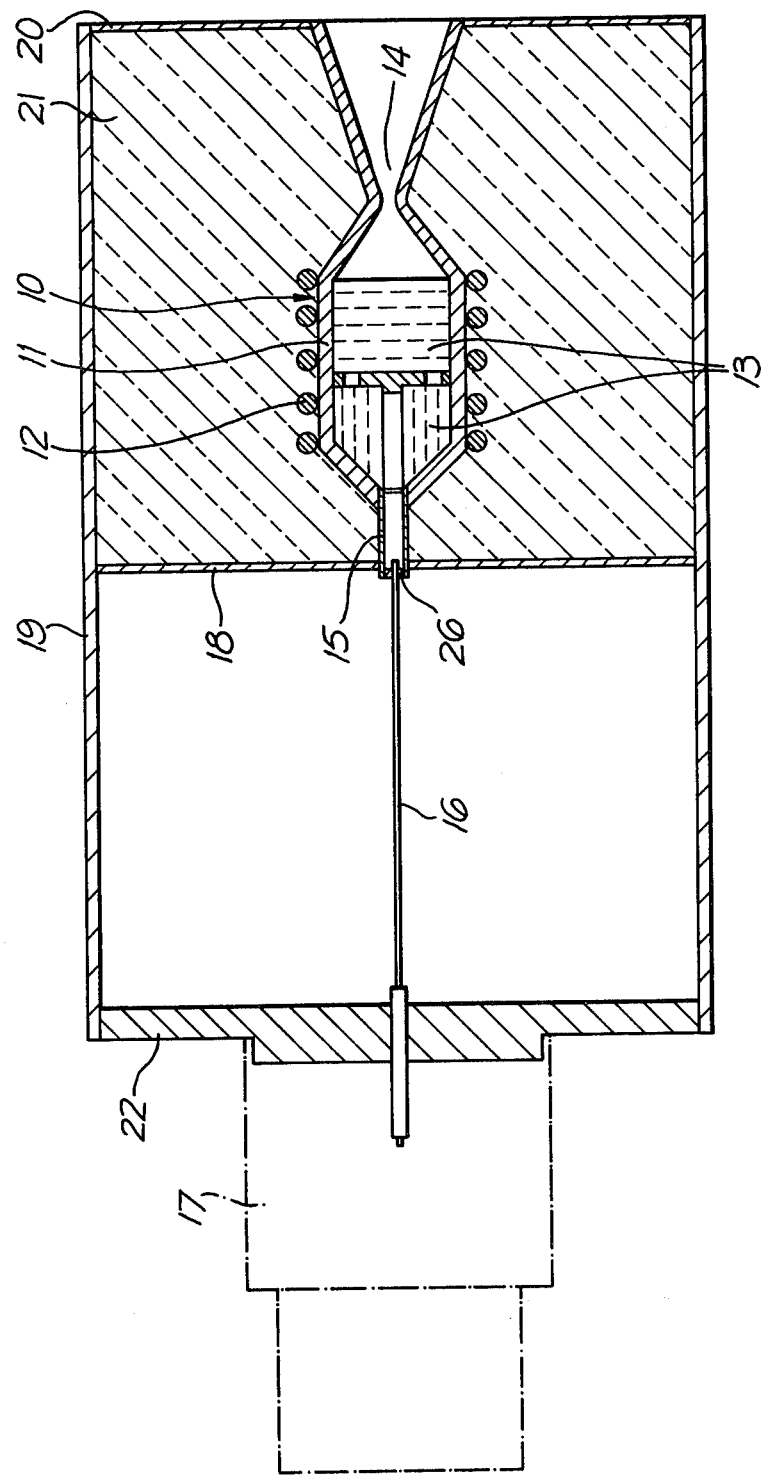

ELECTROTHERMAL GAS THRUST UNITS

The present invention relates to electrothermal gas thrust units as used for the attitude control of space vehicles.

In a typical electrothermal gas thrust unit hydrazine is supplied through an injector tube to a thrust chamber where heat is added. The hydrazine vaporises, decomposes and dissociates into ammonia, nitrogen and hydrogen, with the production of more heat. The resultant hot gases are discharged through a nozzle to produce thrust.

The availability of thrust means constitutes one of the limiting factors of useful life of a space vehicle, so the efficient use of the available hydrazine in a hydrazine thrust unit is essential. As attitude changes of a space vehicle only require small impulses each thrust unit pulse will be of only short duration (of the order of 5 milliseconds) so that transients at the start of a pulse will seriously affect the efficiency of the thrust unit. Transients occur due to heat from the thrust chamber raising the temperature of the thrust chamber to injector tube junction and causing vaporisation of hydrazine in the injector tube. This inhibits flow through the injector tube and can also cause premature decomposition in the tube with a consequent large reduction in thrust and severe thermal cycling and stressing of the injector tube.

According to the present invention an electrothermal gas thrust unit includes a thrust chamber, an extension tube leading into the chamber, an injector tube leading into the extension tube, and a diaphragm member attached to the extension tube adjacent an injector tube to extension tube junction, the diaphragm being formed of a material having good thermal conductivity.

In one form of the invention the diaphragm is spoked and serves as a support member, being mounted on structure which forms part of the means by which the thrust unit is secured to a space vehicle. A similar spoked diaphragm can be used as a mounting between structure and, for example, a thrust nozzle outlet.

One embodiment of the invention will now be described, by way of example only, with reference to the accompanying diagrammatic drawing, which shows in section an elevation of a hydrazine thrust unit.

An electrothermal gas thrust unit has a thrust chamber 10 defined by a cylindrical casing 11 surrounded by an electrical heating element 12. The thrust chamber 10 contains a heat exchanger 13 of known type, and has a downstream end terminating in a convergent divergent thrust nozzle 14. The construction of a heat exchanger 13 and operation of the chamber 10 and associated equipment for vaporising, decomposing, and dissociating hydrazine and discharging the resultant gases are described in UK Pat. No. 1,534,601, do not form part of the present invention, and will not be described herein.

At an upstream end of the thrust chamber 10 the casing 11 tapers to join a cylindrical extension tube 15 which has an end cap 26. An injector tube 16 leads into the extension tube 15 from a flow control valve 17 which is connected to a hydrazine supply (not shown).

A thermally conducting spoked diaphragm 18 connects the downstream end of the extension tube to a thermally conducting or radiating outer support cylinder 19, and a spoked diaphragm 20 connects the extremity of the thrust nozzle 14 to the support cylinder 19. The diaphragms 18, 20 support the casing 11 within the support cylinder 19, and heat radiation from the casing 11 is reduced by insulating material 21 packed between casing 11, cylinder 19 and diaphragms 18, 20. The support cylinder 19 is mounted on an end plate 22 secured to the flow control valve 17. The diaphragms 18, 20 and support cylinder 19 might be formed from, for example, titanium, titanium alloy or stainless steel. They need not all be of the same material.

In operation, when the control system of a space vehicle in which the thrust unit is installed requires the unit to operate, the flow control valve 17 releases a pulse of hydrazine. The hydrazine flows down the injector tube 16 into the extension tube 15 and hence into the thrust chamber 10. In the chamber 10 heat from the heating element 12 vaporises the hydrazine which then decomposes and dissociates with the release of heat. The resultant gases exit through the thrust nozzle 14 providing thrust which alters the attitude of the space vehicle.

Heat from the thrust chamber 10, which has a typical temperature of 600° to 900° C., inevitably passes along the casing 11 to the extension tube 15 and towards the junction between this tube and the injector tube 16. By suitable design of the diaphragm 18 and support structure sufficient heat is conducted along the diaphragm 18 to the support cylinder 19 and hence to the end plate 22, flow control valve 17, and space vehicle structure (not shown) to keep the junction between the injector tube 16 and extension tube 15, through end cap 26, below the temperature, approximately 300° C., at which hydrazine vaporises. This minimises transient effects at the start of each pulse improving the efficiency of hydrazine utilisation and preventing thermal cycling and stressing of the injector tube 16.

I claim:

1. An electrothermal gas thrust unit comprising a thrust chamber defined by a cylindrical casing surrounded by a heating element, the thrust chamber containing a heat exchanger;
   a convergent divergent thrust nozzle extending from a downstream end of said thrust chamber;
   an extension tube extending upstream from an upstream end of said thrust chamber;
   an injector tube leading into said extension tube and joined thereto at a junction to provide a flow path into said chamber via said extension tube, said extension tube having a diameter in excess of said injector tube;
   a flow control valve connected to said injector tube and to a fuel supply; and
   a heat conducting diaphragm connected to said extension tube adjacent said junction between said extension tube and said injector tube.

2. An electrothermal gas thrust unit as claimed in claim 1 wherein said diaphragm is spoked.

3. An electrothermal gas thrust unit as claimed in claim 2 wherein said diaphragm connects the unit to a support cylinder.

4. An electrothermal gas thrust unit as claimed in claim 1 wherein said diaphragm is made from titanium.

5. An electrothermal gas thrust unit as claimed in claim 1 wherein said diaphragm is made from a titanium alloy.

6. An electrothermal gas thrust unit as claimed in claim 1 wherein said diaphragm is made from stainless steel.

7. An electrothermal gas thrust unit comprising a thrust chamber defined by a cylindrical casing surrounded by a heating element, the thrust chamber containing a heat exchanger;
a convergent divergent thrust nozzle extending from a downstream end of said thrust chamber;
an extension tube extending upstream from an upstream end of said thrust chamber;
an injector tube leading into said extension tube and joined thereto at a junction to provide a flow path into said chamber via said extension tube, said extension tube having a diameter in excess of said injector tube;
a flow control valve connected to said injector tube and to a fuel supply; and
a heat conducting diaphragm connected to said extension tube adjacent a junction between said extension tube and said injector tube, said diaphragm being made of titanium, a titanium alloy or stainless steel.

* * * * *